US005290616A

United States Patent [19]

Cowan et al.

[11] Patent Number: 5,290,616

[45] Date of Patent: Mar. 1, 1994

[54] RESEALABLE OVERLAMINATED LEAFLET LABEL

[75] Inventors: Randy G. Cowan; Donovan D. Nelson, both of Sioux Falls, S. Dak.

[73] Assignee: CCL Label, Inc., Grand Rapids, Mich.

[21] Appl. No.: 982,520

[22] Filed: Nov. 27, 1992

[51] Int. Cl.$^5$ .............................................. C09J 7/02

[52] U.S. Cl. .......................................... 428/40; 281/5; 283/81

[58] Field of Search ........................ 428/40, 42; 281/5; 283/81

[56] References Cited

U.S. PATENT DOCUMENTS

| | | |
|---|---|---|
| Re. 24,962 | 4/1961 | Loderhose . |
| 761,357 | 5/1904 | Carpenter . |
| 1,924,909 | 8/1933 | Brown . |
| 1,974,401 | 9/1934 | Miller . |
| 2,093,985 | 9/1937 | Stansbury . |
| 2,127,081 | 8/1938 | Brown . |
| 2,321,184 | 6/1943 | Butterworth . |
| 2,706,865 | 4/1955 | Miller . |
| 3,155,234 | 11/1964 | Knoll et al. . |
| 3,524,782 | 8/1970 | Buske . |
| 4,276,334 | 6/1981 | Sugihara . |
| 4,323,608 | 4/1982 | Denny et al. . |
| 4,529,229 | 7/1985 | Glibbery . |
| 4,534,582 | 8/1985 | Howard . |
| 4,592,572 | 6/1986 | Instance . |
| 4,621,442 | 11/1986 | Mack . |
| 4,621,837 | 11/1986 | Mack . |
| 4,661,189 | 4/1987 | Voy et al. . |
| 4,711,686 | 12/1987 | Instance . |
| 4,726,972 | 2/1988 | Instance . |
| 4,744,161 | 5/1988 | Instance . |
| 4,744,591 | 5/1988 | Instance . |
| 4,747,618 | 5/1988 | Instance . |
| 4,841,712 | 6/1989 | Boou . |
| 4,846,504 | 7/1989 | MacGregor et al. . |
| 4,847,130 | 7/1989 | Cooper . |
| 4,850,613 | 7/1989 | Instance . |
| 4,991,878 | 2/1991 | Cowan et al. . |
| 5,174,605 | 12/1992 | Instance ................................ 428/42 |

*Primary Examiner*—Jenna L. Davis
*Attorney, Agent, or Firm*—Warner, Norcross & Judd

[57] ABSTRACT

A resealable, overlaminated leaflet label is disclosed having a folded leaflet overlaid by a cover sheet having opposed marginal portions extending beyond the edges of the leaflet. The undersurface of the cover sheet is coated with peelable adhesive material such that the marginal portions are peelably adhered directly to the surface of an article with the leaflet disposed between the article and the cover sheet. A base sheet is not used. The undersurface of the bottommost panel of the leaflet may be coated with an adhesive material leaving an adhesive-free peripheral margin.

6 Claims, 2 Drawing Sheets

RESEALABLE OVERLAMINATED LEAFLET LABEL

BACKGROUND OF THE INVENTION

1. Field of the Invention

The present invention relates to a label assembly and, more particularly, to a resealable label having an overlaminated leaflet.

2. Description of the Related Art

Many products are sold with various informational leaflets relating to warranties, operational instructions, label requirements, or other matters. The informational literature is often loosely received within a carton or other packaging along with the particular product. Although this approach may be sufficient in certain instances, it does involve a risk that the information will become separated from the product before being purchased by the ultimate consumer. Moreover, this method has no applicability to the many products which are frequently displayed or sold without an additional carton or box.

In the past, folded leaflet labels have been provided as printed, multipage leaflets adhered to the front surface of a base label or base sheet. The rear surface of the base sheet is coated with an adhesive material used to adhere the base sheet to the surface of an article. In some approaches, the base label extends beyond the edges of the leaflet, and the front surface of the leaflet is overlaid by an overlaminate, or cover sheet which has marginal portions also extending beyond the edges of the leaflet. The rear surface of the cover sheet is coated with a peelable adhesive such that the marginal portions of the rear surface of the cover sheet are adhered to the front surface of the base sheet. In one approach, access to the leaflet is made by peeling the marginal portions of the cover sheet away from the base sheet. In another approach, the cover sheet is formed with a tear line, and access to the leaflet is made by tearing the cover sheet along the tear line.

SUMMARY OF THE INVENTION

The present invention provides an overlaminated leaflet label which does not employ a base sheet. The label according to the principles of the invention includes a multipanel leaflet which is overlaid by a peelable adhesive coated cover sheet having marginal portions extending beyond a pair of opposed edges of the leaflet. The marginal portions of the cover sheet are adhered directly to the article to which the label is applied. Access to the leaflet is made by peeling one or both of the marginal portions of the cover sheet from the article. Since tear lines are not used, the label may be resealed by readhering the marginal portion or portions of the cover sheet to the article.

The rear surface of the leaflet may also be coated with an adhesive material such that the leaflet is also adhered to the article. In an embodiment of the invention, the adhesive material on the rear surface of the leaflet does not extend all the way to the perimeter of the leaflet such that the rear surface has an adhesive-free peripheral margin. This adhesive free margin prevents any adhesive from migrating beyond the edges of the leaflet and avoids problems with any cutting devices used to form the leaflet.

These and other objects, advantages, and features of the present invention will be more fully understood and appreciated by reference to the written specification and appended drawings.

DESCRIPTION OF THE PREFERRED EMBODIMENT

Figure 1:
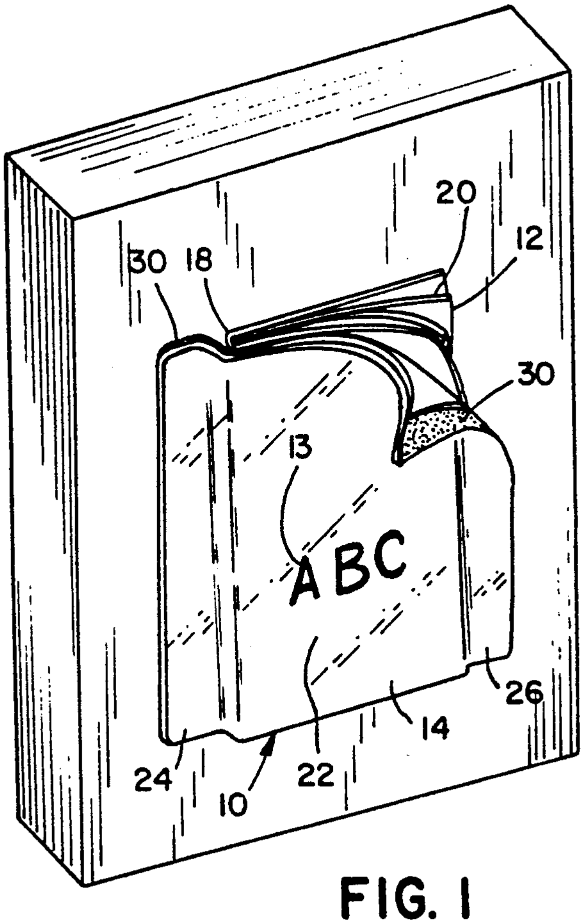
FIG. 1 is a perspective view of an overlaminated leaflet label according to the principles of the invention adhered to the surface of an article and partially peeled away therefrom.

By way of disclosing a preferred embodiment, and not by way of limitation, there is shown in FIG. 1 an overlaminated leaflet label 10 adhered to the surface of an article A. The label is comprised of a leaflet 12 overlaid by a cover sheet 14. Preferably, cover sheet 14 is of a flexible, transparent material, such as plastic, such that printing 13 on the leaflet is visible through the cover sheet. Typically, the article will be a product container and the leaflet will be printed with information regarding the contents of the container or the use of the contents. However, the invention is not limited as to the nature of the article A or the information carried on the leaflet.

Figure 2:
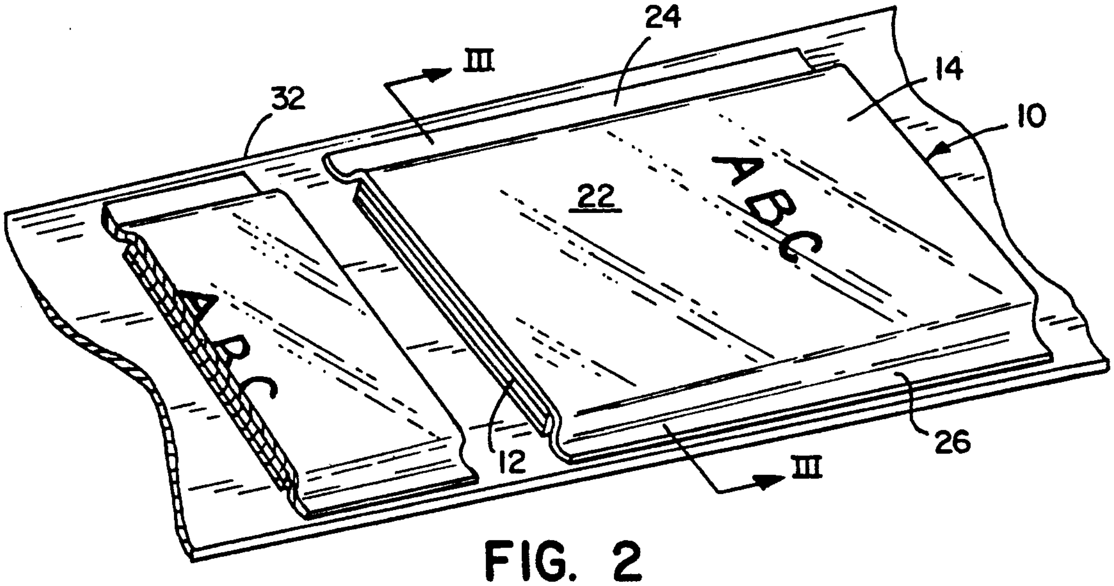
FIG. 2 is a perspective view of the overlaminated leaflet label adhered to a release liner sheet.
Figure 3:
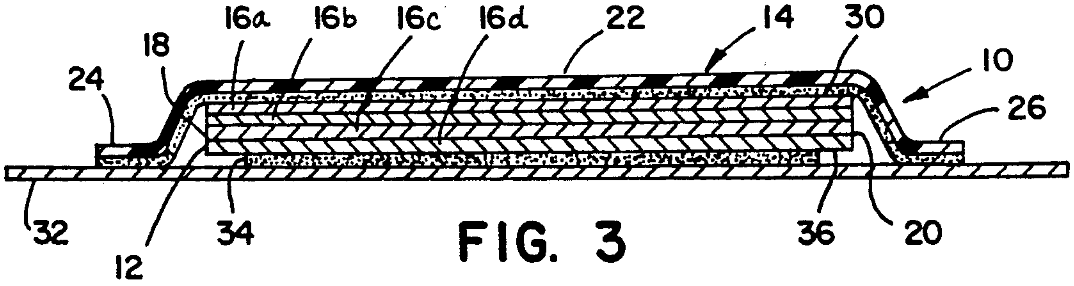
FIG. 3 is a sectional view taken along the line III—III of FIG. 2.

Referring also to FIGS. 2 and 3, the leaflet 10 is generally rectangular and formed as a number of pages or panels **16*a*–16*d* stacked in overlying relationship. In the embodiment of FIG. 3, the panels 16*a*–16*d* are adhered together along one edge 18 such that the panels are free along the opposed, spaced apart edge 20** and may be opened like the pages of a book.

The leaflet is overlaid by top sheet 14. Top sheet 14 has front and rear major surfaces, and a central portion 22 of the top sheet overlies the front surface of the top panel **16*a* of the leaflet 12. Top sheet 14 includes a pair of opposed, marginal portions 24, 26 which extend outwardly from the central portion 22 beyond the edges 18, 20** of the leaflet.

As best shown in FIG. 3, a layer of peelable, pressure sensitive adhesive material 30 is disposed between the cover sheet 14 and the topmost panel **16*a* of the leaflet. The peelable adhesive material 30 extends beyond the edges 18, 20 of the leaflets and coats the underside of the marginal portions 24, 26 of the cover sheet 14. The peelable adhesive material 30 thus adheres the leaflet 12 to the cover sheet 14**.

As shown in FIG. 1, the peelable adhesive material 30 on the marginal portions 24, 26 also adheres the label to the surface of the article A with the leaflet disposed between the article and the cover sheet 14. In order to access the leaflet, one or both of the marginal portions 24, 26 is peeled from the surface of the article. The marginal portions 24, 26 are adhered directly to the surface of the article without a base sheet. Preferably, the peelable adhesive material is also resealable, such that the marginal portions 24, 26 may again be adhered to the article to close and contain the leaflet.

Referring to FIGS. 2 and 3, the leaflet labels 10 are preferably provided temporarily adhered to a sheet of release liner material 32, such as a silicone coated paper.

A number of labels may be provided carried end-to-end on a continuous web of release liner.

Figure 4:
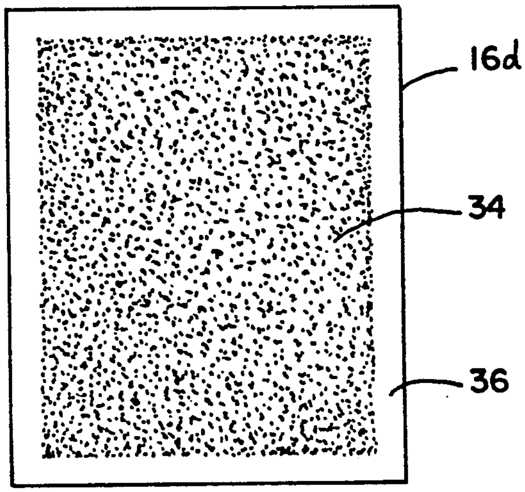
FIG. 4 is a rear plan view of the leaflet of FIG. 3.

As shown in FIG. 3 and 4, the rear surface of the bottommost panel **16*d* of the leaflet is coated with an adhesive material 34. If it is desired that the leaflet be removable from the article to which the label is adhered, then the adhesive material 34 may be a peelable adhesive. Alternatively, it may be desired to leave the leaflet permanently adhered to the article, in which event the adhesive material 34** may be a permanent adhesive.

Advantageously, the adhesive material 34 on the rear surface of the bottommost panel **16*d* of the leaflet is applied only to the central portion of the panel leaving an adhesive free peripheral margin 36. The adhesive-free peripheral margin spaces the adhesive material 34 away from the perimeter of leaflet such that the adhesive material cannot migrate beyond the perimeter of the leaflet. The adhesive-free margin 36 also ensures that the adhesive material 34 will not interfere with the operation of any cutting device used to form the leaflet or label after the adhesive material 34 is applied. Also, any pressure applied by a cutting device along the perimeter of the leaflet will be spaced apart from the adhesive material 34 and thus avoid the creation of any undesired increase in adhesion by the adhesive material 34**.

Figure 5:
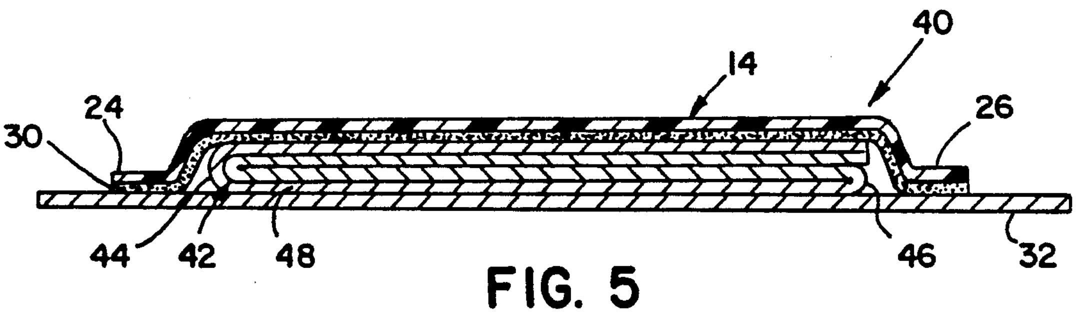
FIG. 5 is a sectional view similar to FIG. 3 but illustrating an alternate embodiment of the overlaminated leaflet label.

An alternate embodiment of a leaflet label 40 according to the principles of the invention is shown in FIG. 5. In this embodiment, the leaflet 42 is formed of a single strip of sheet material folded along edges 44, 46 to form four panels. Cover sheet 14 with peelable adhesive 30 overlies the leaflet with marginal portions 24, 26 temporarily adhered to a release liner sheet 32 or peelably adhered to the surface of an article A. The rear surface of the bottommost panel 48 of the leaflet is not coated with an adhesive material, such that the leaflet may be easily removed from an article upon peeling of the marginal portions 24, 26. Again, a base sheet is not used.

The above description is that of a preferred embodiment of the invention. Various alterations and changes can be made without departing from the spirit and broader aspects of the invention as set forth in the appended claims, which are to be interpreted in accordance with the principles of patent law, including the Doctrine of Equivalents.

We claim:

1. A leaflet label assembly comprising:

a release liner;

a leaflet having a plurality of panels disposed in overlying relationship including a topmost panel and a bottommost panel, and further having a pair of opposed, spaced apart edges, said bottommost panel engaging said release liner; and a cover sheet having opposed front and rear major surfaces, said rear major surface coated with an adhesive material, said rear major surface having a central portion overlyingly adhered to said topmost panel of said leaflet and further having opposed marginal portions extending from opposed sides of said central portion beyond said leaflet edges, said marginal portions adhered directly to said release liner.

2. The leaflet label of claim 1 wherein said bottommost panel has a rear surface, and further comprising adhesive material on said rear surface of said bottommost panel.

3. The leaflet label of claim 3 further comprising an adhesive-free peripheral margin on said rear surface of said bottommost panel.

4. A leaflet label assembly providing a leaflet label adherable to an article without a base sheet comprising:

a release liner;

a leaflet having a plurality of overlying panels and including a front surface and a rear surface and a pair of opposed, spaced apart edges, said rear surface engaging said release liner;

a cover sheet having a rear major surface with a central portion overlying said front surface of said leaflet and having a pair of opposed, spaced apart marginal portions extending beyond said pair of leaflet edges, said marginal portions engaging said release liner; and an adhesive on the rear surface of said marginal portions engaging said release liner.

5. The leaflet label of claim 4 further comprising an adhesive on the rear surface of said central portion adhering said front surface of said leaflet to the rear surface of said central portion.

6. The leaflet label of claim 4 further comprising a second adhesive on a central portion of said rear surface of said leaflet, said rear surface of said leaflet having an adhesive-free peripheral margin.

* * * * *